United States Patent [19]

Usami

[11] Patent Number: 5,652,644
[45] Date of Patent: Jul. 29, 1997

[54] COLOR IMAGE PROCESSING APPARATUS WHICH PERFORMS COLOR CORRECTION IN ACCORDANCE WITH INPUT COLOR DATA

[75] Inventor: Akihiro Usami, Tokyo, Japan

[73] Assignee: Canon Kabushiki Kaisha, Tokyo, Japan

[21] Appl. No.: 624,659

[22] Filed: Mar. 28, 1996

Related U.S. Application Data

[60] Continuation of Ser. No. 417,225, Apr. 5, 1995, abandoned, which is a division of Ser. No. 115,799, Sep. 3, 1993, Pat. No. 5,434,645, which is a continuation of Ser. No. 684,146, Apr. 11, 1991, abandoned, which is a continuation of Ser. No. 391,664, Aug. 8, 1989, abandoned, which is a continuation of Ser. No. 38,238, Apr. 14, 1987, abandoned.

[30] Foreign Application Priority Data

Apr. 16, 1986 [JP] Japan .................. 61-086139

[51] Int. Cl.$^6$ .............. G03F 3/08; G03B 27/80; H04N 1/46
[52] U.S. Cl. .............. 355/38; 347/118; 358/520
[58] Field of Search .............. 355/32, 38, 200, 355/202, 326; 347/118; 358/516, 520, 521, 523, 530

[56] References Cited

U.S. PATENT DOCUMENTS

| | | | |
|---|---|---|---|
| 3,622,698 | 11/1971 | Richeson et al. | 178/6 |
| 4,032,969 | 6/1977 | Ueda | 355/80 |
| 4,060,829 | 11/1977 | Sakamoto | 358/80 |
| 4,285,009 | 8/1981 | Klopsch | 358/76 |
| 4,349,835 | 9/1982 | Horiguchi et al. | 358/76 |
| 4,364,084 | 12/1982 | Akimoto et al. | 358/76 |
| 4,383,277 | 5/1983 | Kubo | 358/258 |
| 4,572,657 | 2/1986 | Amano et al. | 355/38 |
| 4,622,582 | 11/1986 | Yamada | 358/80 |
| 4,626,903 | 12/1986 | Giesche et al. | 258/80 |
| 4,663,662 | 5/1987 | Sekizawa et al. | 358/80 X |
| 4,679,074 | 7/1987 | Sugiura et al. | 358/80 |
| 4,707,118 | 11/1987 | Terashita | 355/38 |
| 4,734,762 | 3/1988 | Aoki et al. | 358/80 |
| 4,782,390 | 11/1988 | Hayashi et al. | 358/80 X |
| 4,819,193 | 4/1989 | Imao | 358/80 X |
| 4,845,550 | 7/1989 | Urabe et al. | 358/80 |

FOREIGN PATENT DOCUMENTS

| | | |
|---|---|---|
| 0084228 | 7/1983 | European Pat. Off. . |
| 60-38975 | 2/1985 | Japan . |
| 2073987 | 10/1981 | United Kingdom . |

OTHER PUBLICATIONS

Dillenburger, W.: Einführung in die Fernsehtechnik, vol. 2, Berlin, Schiele und Schön, 1969, pp. 25–30.

*Primary Examiner*—Fred L. Braun
*Attorney, Agent, or Firm*—Fitzpatrick, Cella, Harper & Scinto

[57] ABSTRACT

A color image processing apparatus includes a plurality of image reading units, each of which reads an original image and produces a color image signal, a color image recording unit which records a color image in accordance with the color image signal, and a correction unit provided for each of the plurality of image reading units to correct the color image signal such that each image reading unit has the same overall spectral sensitivity characteristics.

8 Claims, 2 Drawing Sheets

1

COLOR IMAGE PROCESSING APPARATUS WHICH PERFORMS COLOR CORRECTION IN ACCORDANCE WITH INPUT COLOR DATA

This application is a continuation of application Ser. No. 08/417,225 filed Apr. 5, 1995, now abandoned, which was a division of application Ser. No. 08/115,799, filed Sep. 3, 1993, now U.S. Pat. No. 5,434,645, which was a continuation of application Ser. No. 07/684,146 filed Apr. 11, 1991, now abandoned, which was a continuation of application Ser. No. 07/391,664 filed Aug. 8, 1989, now abandoned, which was a continuation of application Ser. No. 07/038,238 filed Apr. 14, 1987, now abandoned.

BACKGROUND OF THE INVENTION

1. Field of the Invention

The present invention relates to a color image processing apparatus for processing a color image signal, such as a copying machine.

2. Related Background Art

A color processing system in a conventional color copying machine is constructed as shown in FIG. 2. Particularly, an image of a color original 1 is opto-electrically converted into an electrical signal by a color charge coupled device (CCD) 6. An analog/digital (A/D) converter 7 converts red (R), green (G) and blue (B) color analog signals from the CCD 6 into digital signals. A color processing circuit 8 forms yellow (Y), magenta (M), cyan (C) and black (Bk) color signals based on the output signals of the A/D converter 7. A driver 9 is used for recording a reproduced color image, for example, on a recording paper, in accordance with the signals from the color processing circuit 8.

A printer is constructed, for example, as shown in FIG. 6. In FIG. 6, a rotary polygon mirror 11 reflects (scans), for example, a laser beam corresponding to a color image signal (Y, M, C and Bk). A light reflected by the polygon mirror 11 is reflected by a mirror 12 to be applied to a photosensitive drum 14 which is developed with each color (Y, M, C and Bk) toner by a rotary developer 13. Each color toner on the drum 14 is transferred on a transfer sheet 16 wound about a transfer drum 15 and thereafter, the toner is fixed on the transfer sheet 16 by a fixing roller 17.

Such a color processing system of a color copying machine is broadly divided into a reader including the CCD 6 and the A/D converter 7 and a printer including the color processing circuit 8 and the driver 9.

A single color processing circuit is used in such a color copying machine to effect color correction at the reader and the printer.

There arises a problem, however, if a plurality of readers are intended to be used for a single printer. As shown in FIG. 3, a reader is constructed of an original support glass 2 on which an original 1 is placed, a lighting system 3, a focusing element array 4 for reading the original 1 and producing the image, an infrared cut filter 5, and a CCD 6 for converting a light from the focusing element array 4 via the filter 5 into an electrical signal. In such a construction, there are many scatterings in manufacture, such as of a color temperature of a lamp constituting the lighting system 3, of a spectral transmission factor of the focusing element array 4, of a spectral transmission factor of the infrared cut filter 5, and of a spectral transmission factor of each R, G or B filter of the contact type color CCD 6. These scatterings determine an overall spectral sensitivity characteristics of each reader.

As a result, if a plurality of readers are used in reading the same color image original, each reader may output a different value so that if the printer uses the output value as it is, a different color copy may be obtained.

SUMMARY OF THE INVENTION

It is an object of the present invention to provide a color image processing apparatus eliminating the above disadvantage.

It is another object of the present invention to provide a color image processing apparatus capable of obtaining the same color reproducing characteristics of each reader in case a plurality of readers and a single printer are used respectively for reading an image and printing a color signal.

It is an object of the present invention to provide a color image processing apparatus which comprises a plurality of image reading means each for reading an original image and producing a color image signal, single color image recording means for recording a color image in accordance with the color image signal and correction means provided for each of the plurality of image reading means for correcting the color image signal such that each image reading means has the same overall spectral sensitivity characteristics.

The other objects of the present invention will become apparent from the following detailed description taken in connection with the accompanying drawings.

DETAILED DESCRIPTION OF THE PREFERRED EMBODIMENTS

Figure 1:
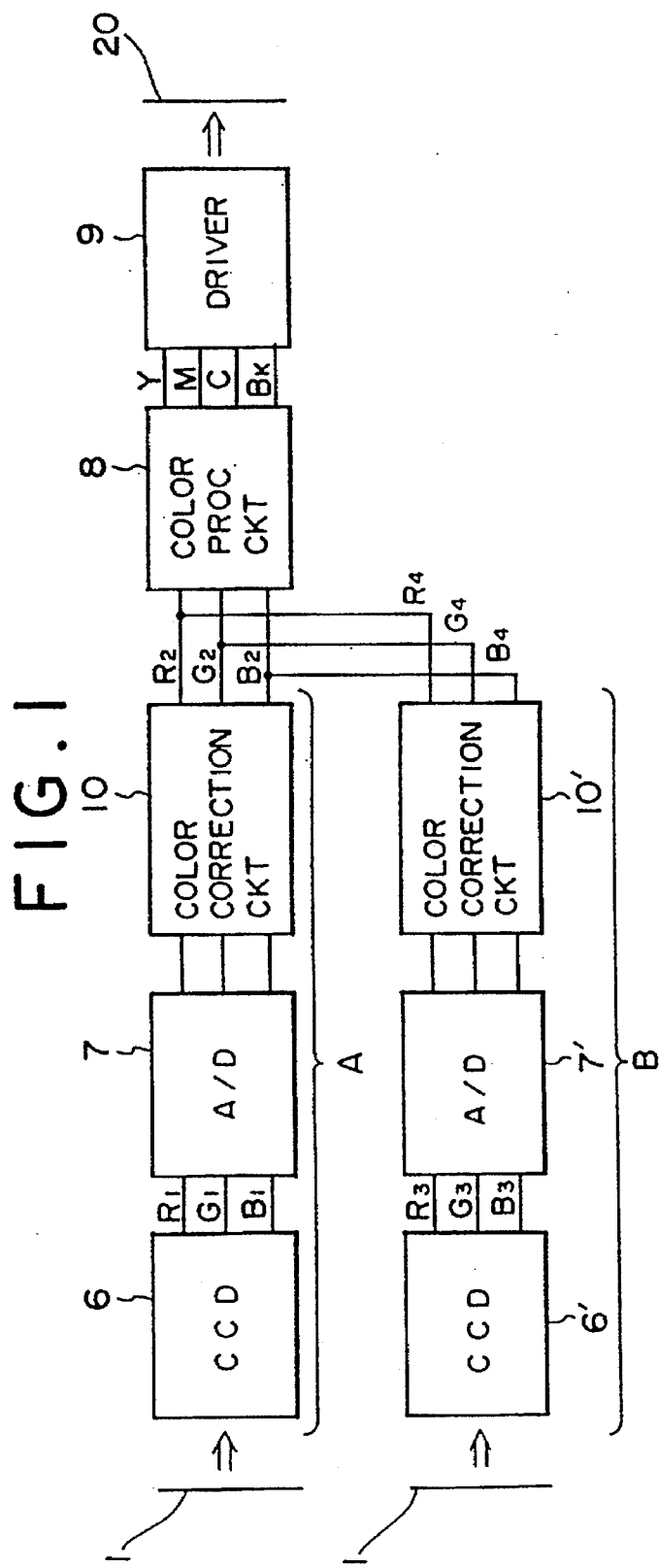
FIG. 1 is a block diagram showing an embodiment of the color image processing apparatus according to the present invention.
Figure 2:
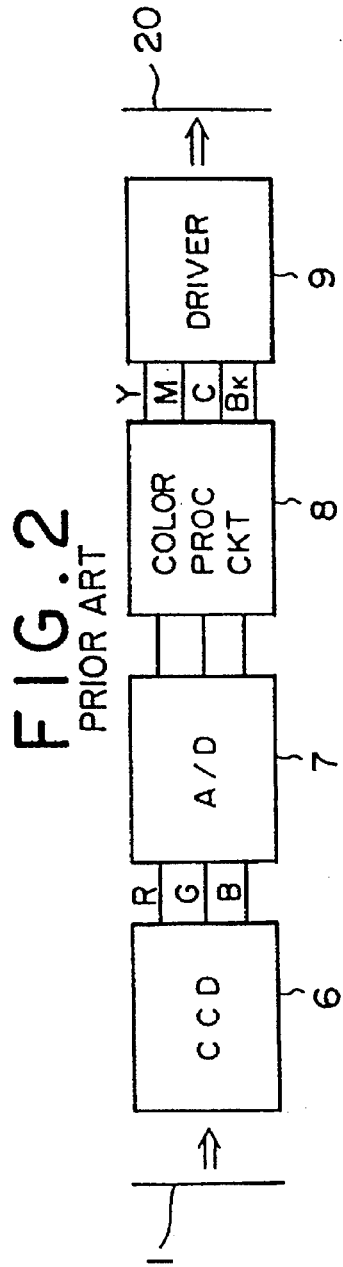
FIG. 2 is a block diagram showing a conventional color processing system.
Figure 3:
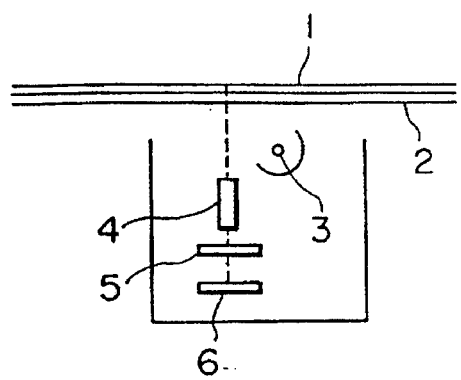
FIG. 3 shows the construction of a reader.
Figure 4:
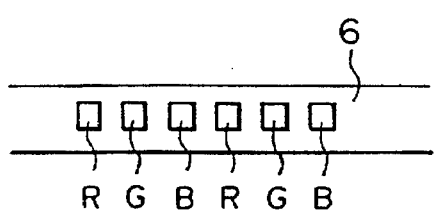
FIG. 4 is a schematic diagram showing a contact type color CCD.

FIG. 1 is a block diagram showing an embodiment of the color image processing apparatus according to the present invention, wherein two readers are connected to a single printer.

Referring to FIG. 1, readers A and B are constructed of CCD's 6 and 6', A/D converters 7 and 7' and color correction circuits 10 and 10', respectively.

The CCD's 6 and 6' read a color original 1 and convert the color image into an electrical signal. The R, G and B output signals ($R_1$, $G_1$, $B_1$, $R_3$, $G_3$ and $B_3$) are A/D converted by the A/D converters 7 and 7' and input to the color correction circuit 10 and 10'.

The output signals ($R_2$, $G_2$, $B_2$, $R_4$, $G_4$ and $B_4$) from the two color correction circuits 10 and 10' are converted by a color processing circuit 8 into Y, M, C and Bk color signals and input to a driver 9 to record them on a recording paper 20 and obtain color images.

The color correction circuits 10 and 10' are used for correcting the overall spectral sensitivity characteristics of the readers, the readers each having CPU, RAM and ROM and correcting R, G, and B color digital signal values from the A.D converters 7 and 7'.

Figure 5:
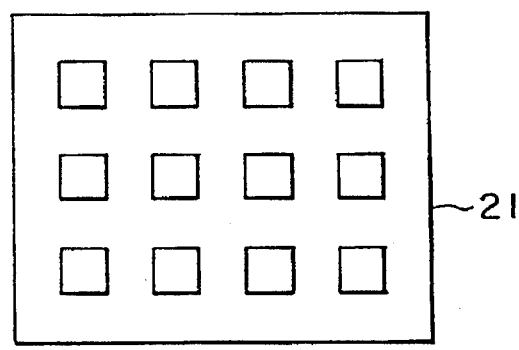
FIG. 5 shows an example of a color mixture patch.
Figure 6:
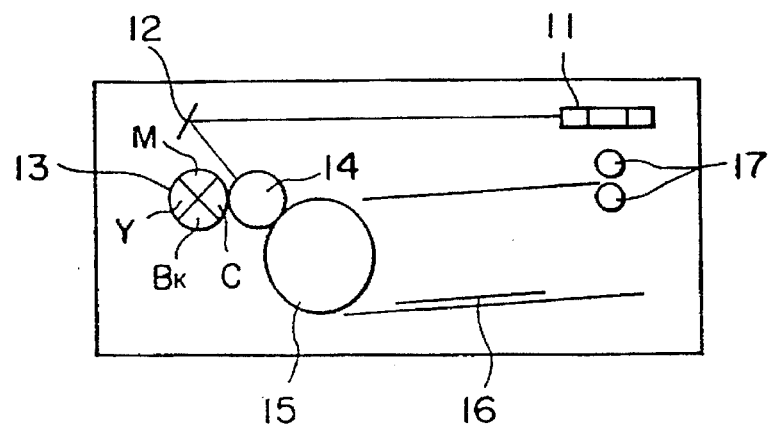
FIG. 6 shows the construction of a printer.

Particularly, each reader A or B reads a color mixture patch 21 shown in FIG. 5 instead of the original 1. Then, correction coefficients of the color correction circuits 10 and

10' are determined such that the output signals ($R_2$, $G_2$ and $B_2$) of the reader A become equal to the output signals ($R_4$, $G_4$ and $B_4$) of the reader B.

First, assume that the color correction coefficients of the reader A are simplified as:

$R_{2i}=R_i$, $G_{2i}=G_i$, $B_{2i}=B_i$ where i is the color patch number.

Next, assume that the outputs ($R_4$, $G_4$ and $B_4$) of the reader B are given by:

$$\begin{bmatrix} R_{4i} \\ G_{4i} \\ B_{4i} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_{3i} \\ G_{3i} \\ B_{3i} \end{bmatrix}$$

The coefficients $a_{ij}$ (i, j are 1 to 3) are determined using the least square method such that each difference between $R_{2i}$ and $R_{4i}$, between $G_{2i}$ and $G_{4i}$, and between $B_{2i}$ and $B_{4i}$ becomes smallest. An example of determining the coefficients is given below taking R as an example:

$$\phi_R = \sum_i (R_{4i} - R_{2i})^2 = \sum_i (a_{11} R_{3i} + a_{12} G_{3i} + a_{13} B_{3i} - R_{2i})^2$$

The partial differential equation of $\phi_R$ relative to $a_{11}$, $a_{12}$ and $a_{13}$ yield:

$$\frac{\partial \phi_R}{\partial a_{11}} = 0, \frac{\partial \phi_R}{\partial a_{12}} = 0, \frac{\partial \phi_R}{\partial a_{13}} = 0,$$

The above simultaneous equations are solved to determine $a_{11}$, $a_{12}$ and $a_{13}$. A similar calculation is conducted for G and B to thereby obtain all the coefficients $a_{ij}$ (i, j=1 to 3). The obtained coefficients $a_{ij}$ are stored in the ROM of the color correction circuit 10' of the reader B. The color correction circuit 10' corrects the input signals ($R_3$, $G_3$ and $B_3$) in accordance with the coefficients.

As a result, a difference between the output signals ($R_2$, $G_2$ and $B_2$) of the color correction circuit 10 of the reader A and the output signals ($R_4$, $G_4$ and $B_4$) of the color correction circuit 10' of the reader B, respectively for a same color original, can be made as small as possible, thus obtaining substantially the same color image on the recording paper 20.

Signals to be color-corrected may be Y, M and C signals instead of R, G and B signals, or may be Y, M and C signals after density conversion (logarithmic conversion or the like).

Further, the color processing circuit 8 of the printer may be assembled in the reader to be combined with the color correction circuits 10 and 10'.

As described so far, a plurality of color image reading means can be connected to a single color image recording means while retaining the same overall spectral sensitivity characteristics.

The present invention is not limited only to the above embodiment, but various applications and modifications are possible within the scope of the appended claims.

What is claimed is:

1. An image processing apparatus comprising:

first input means for inputting first color data generated by a first color inputting apparatus which includes a first lighting means and a first color reading sensor, the first color data representing an original image;

second input means for inputting second color data generated by a second color inputting apparatus which is independent of the first color inputting apparatus and which includes a second lighting means and a second color reading sensor, the second color data representing the same original image as the first color data; and formation means for forming, by a calculation, correction data relating to the first color inputting apparatus on the basis of both the first color data and the second color data, such that a characteristic of the first color inputting apparatus is equal to a characteristic of the second color inputting apparatus;

wherein the correction data is used when a color correction is performed on color image data supplied from the first color inputting apparatus such that the characteristic of the first color inputting apparatus is equal to the characteristic of the second color inputting apparatus.

2. An apparatus according to claim 1, wherein the correction data is matrix data.

3. An apparatus according to claim 1, wherein the original image comprises a plurality of different color patches, and wherein said formation means forms the correction data on the basis of first color data and second color data which corresponds to each of the plurality of different color patches.

4. An apparatus according to claim 3, wherein the plurality of different color patches include a color patch having mixed colors.

5. An apparatus according to claim 1, wherein the color data is R, G and B data.

6. An apparatus according to claim 1, wherein said formation means forms the correction data on the basis of the second color data, and, if the color data input by said first input means is corrected by the correction data, the corrected color data becomes substantially the same as color data to be input by said second input means.

7. An apparatus according to claim 1, wherein the first color inputting apparatus and the second color inputting apparatus comprise a scanner for reading an original image and for producing color image data.

8. An image processing method comprising:

a first inputting step for inputting first color data generated by a first color inputting apparatus which includes a first lighting means and a first color reading sensor, the first color data representing a standard original;

a second inputting step for inputting second color data generated by a second color inputting apparatus which is independent of the first color inputting apparatus and which includes a second lighting means and second color reading sensor, the second color data representing a same standard original as the first color data; and a formation step for forming, by a calculation, correction data relating to the first color inputting apparatus on the basis of both the first color data and the second color data, such that a characteristic of the first color inputting apparatus is equal to a characteristic of the second color inputting apparatus;

wherein the correction data is used when a color correction is performed on color image data supplied from the first color inputting apparatus such that the characteristic of the first color inputting apparatus is equal to the characteristic of the second color inputting apparatus.

* * * * *